Figure 1:
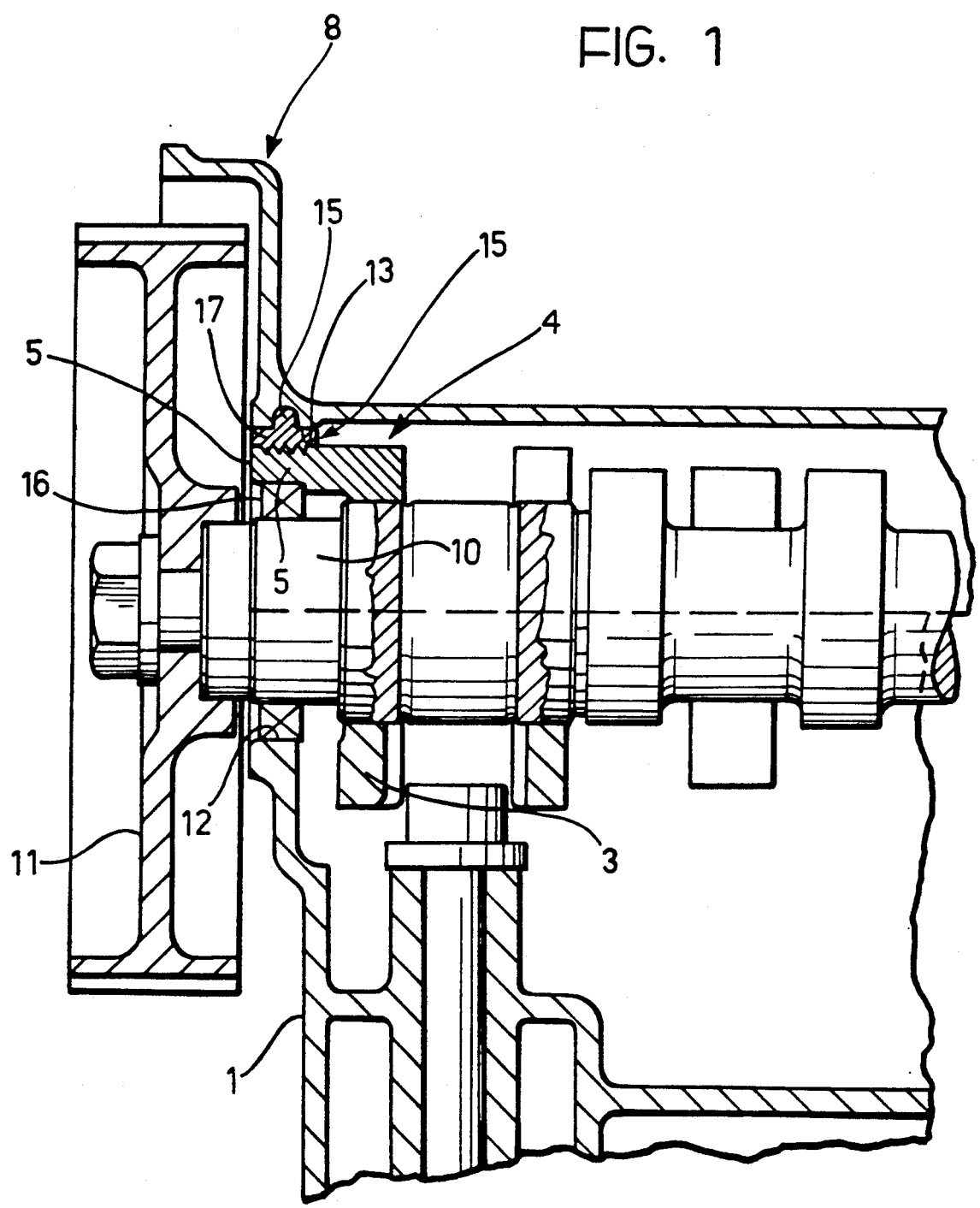

United States Patent [19]

Ferrazzi

[11] Patent Number: 5,080,058
[45] Date of Patent: Jan. 14, 1992

[54] INTERNAL COMBUSTION ENGINE FOR MOTOR VEHICLES

[75] Inventor: Francesco Ferrazzi, Turin, Italy
[73] Assignee: Fiat Auto SpA, Turin, Italy
[21] Appl. No.: 711,765
[22] Filed: Jun. 7, 1991
[30] Foreign Application Priority Data
Jun. 8, 1990 [IT] Italy .................. 67418 A/90
[51] Int. Cl.⁵ ............................................ F02F 11/00
[52] U.S. Cl. ..................... 123/193 H; 277/235 B; 277/207 R
[58] Field of Search ............ 123/193 H; 277/235 B, 277/235 A, 235 R, 207 R

[56] References Cited

U.S. PATENT DOCUMENTS

| | | | |
|---|---|---|---|
| 3,123,367 | 3/1964 | Brummer et al. | 277/207 R |
| 3,379,444 | 4/1968 | Brummer et al. | 277/207 R |
| 3,386,746 | 6/1968 | Liebig | 277/207 R |
| 4,285,527 | 8/1981 | Connely | 277/235 B |

Primary Examiner—Andrew M. Dolinar
Assistant Examiner—M. Macy
Attorney, Agent, or Firm—Sughrue, Mion, Zinn, Macpeak & Seas

[57] ABSTRACT

An internal combustion engine for motor vehicles in which a gasket with arcuate portions complementary to those of the end caps is interposed between the retaining caps for the ends of the or each camshaft and the cover of the head. Each of the caps has an outer surface formed with a plurality of alternating, parallel grooves and projections engaged with complementary projections and grooves of the corresponding arcuate portion of the gasket.

3 Claims, 3 Drawing Sheets

INTERNAL COMBUSTION ENGINE FOR MOTOR VEHICLES

DESCRIPTION

The present invention relates to an internal combustion engine for motor vehicles, having a head, at least one camshaft supported for rotation by bearings formed in the head, respective arcuate retaining caps fixed to the bearings, in which the bearing and the respective cap for at least one end of the shaft are adjacent the peripheral edge of the head, a cover for the head having a peripheral edge which is fixed to that of the head and, in correspondence with the end cap, has a portion of complementary arcuate profile, and a gasket which is interposed between the fixing edges of the head and the cover and has an arcuate portion interposed between the end cap and the said portion of the fixing edge of the cover of complementary arcuate profile.

In an engine of this type, the regions of the head most prone to leakage of the lubricating oil in operation are precisely those corresponding to the ends of the or each camshaft, particularly in correspondence with the arcuate sealing surfaces between the end retaining caps and the gasket of the cover.

Solutions proposed up to now in an attempt to solve this problem consist of the use of additional fixing screws between the cover and the head adjacent the critical regions, the tightening of the screws being intended to compress the gasket as uniformly as possible. This solution is inadequate, however, since it does not completely eliminate the risk of oil leakage.

The object of the present invention is to solve this problem and to provide an internal combustion engine for motor vehicles of the type defined above, in which there is effectively no risk of leakage of the lubricating oil in correspondence with the projecting ends of the camshaft or camshafts.

According to the invention, this object is achieved by virtue of the fact that the or each end cap has an outer surface formed with a plurality of alternating, parallel grooves and projections and the corresponding arcuate portion of the gasket has an inner surface formed with a plurality of alternating, parallel projections and grooves engaged respectively with the grooves and projections of the outer surface of the end cap.

According to a preferred embodiment of the invention, the grooves and projections have V-shaped cross-sections with corresponding dimensions.

According to a variant, the projections have V-shaped cross-sections and the grooves are wider than the projections.

Both embodiments provide a sealing surface constituted by a row of successive barriers formed by the resilient compression of the gasket as a result of its being clamped between the head and the cover.

Figure 2:
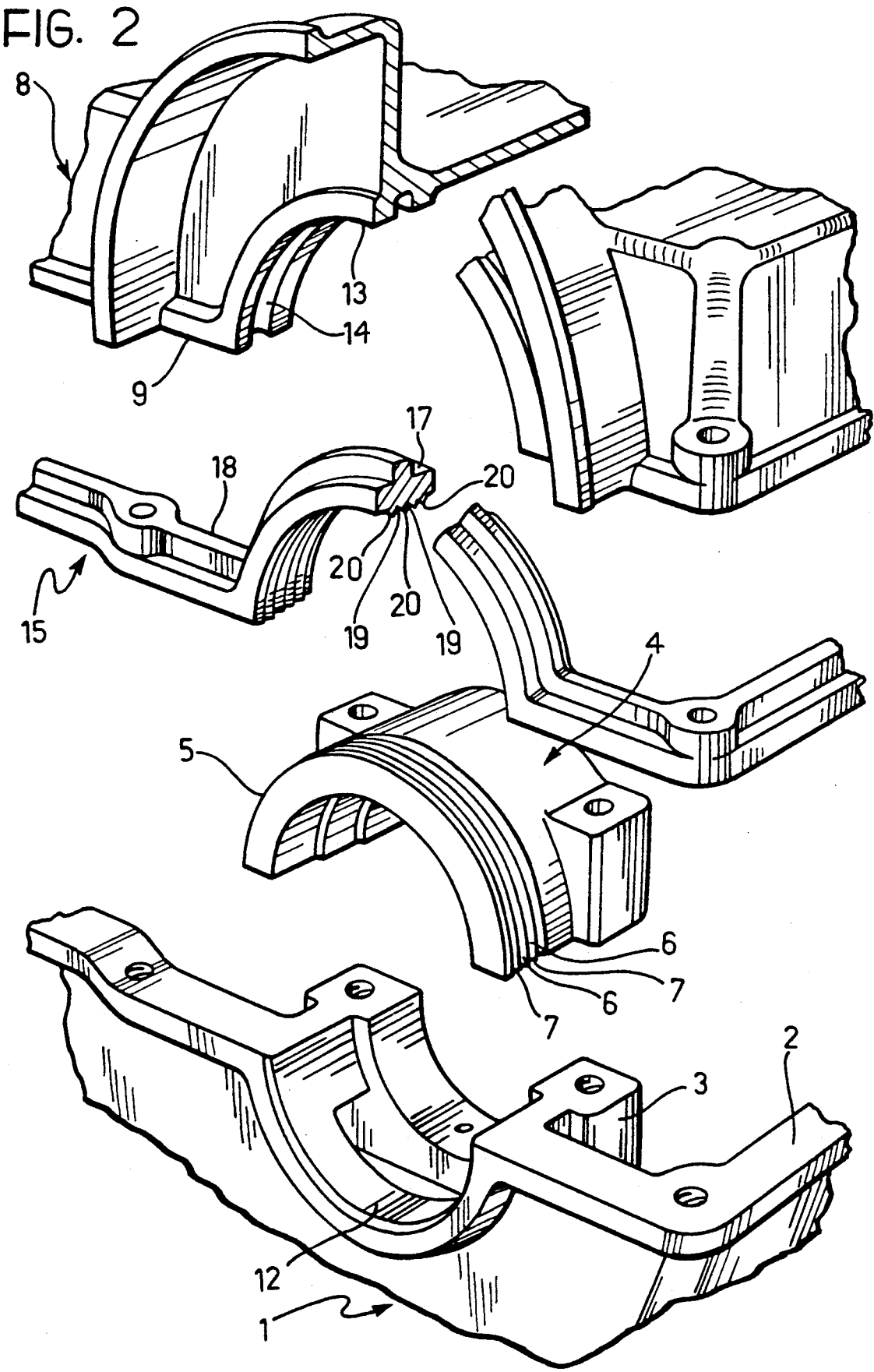
Figure 3:
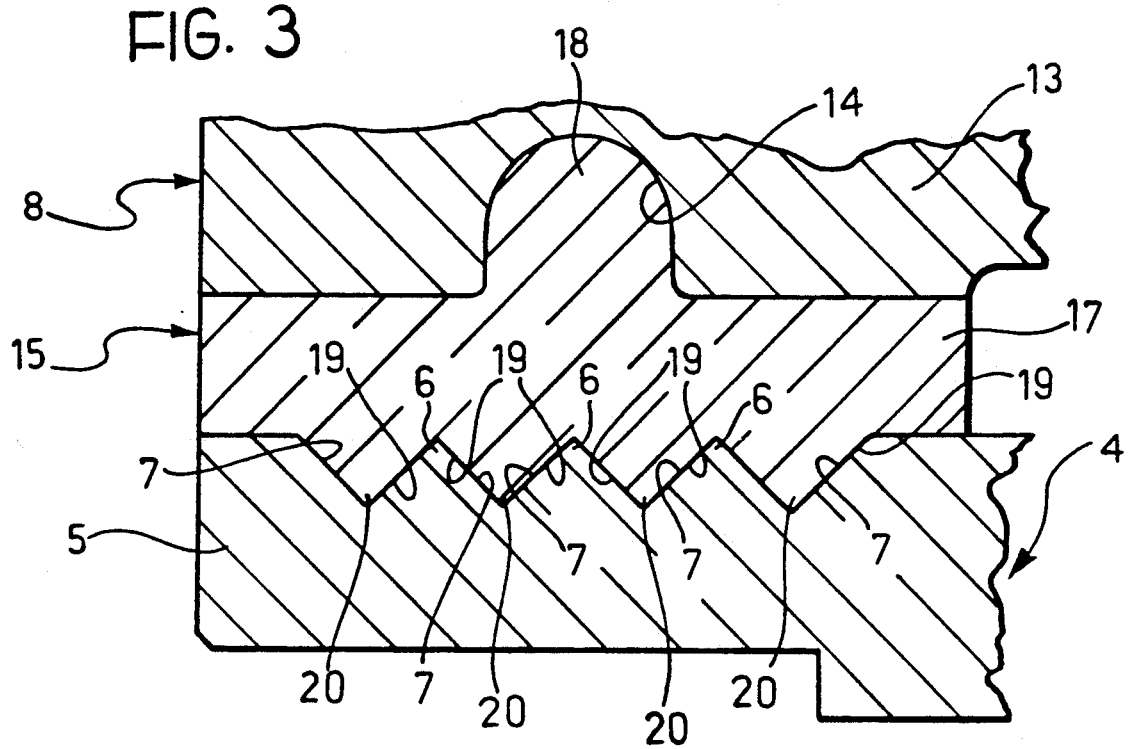
Figure 4:
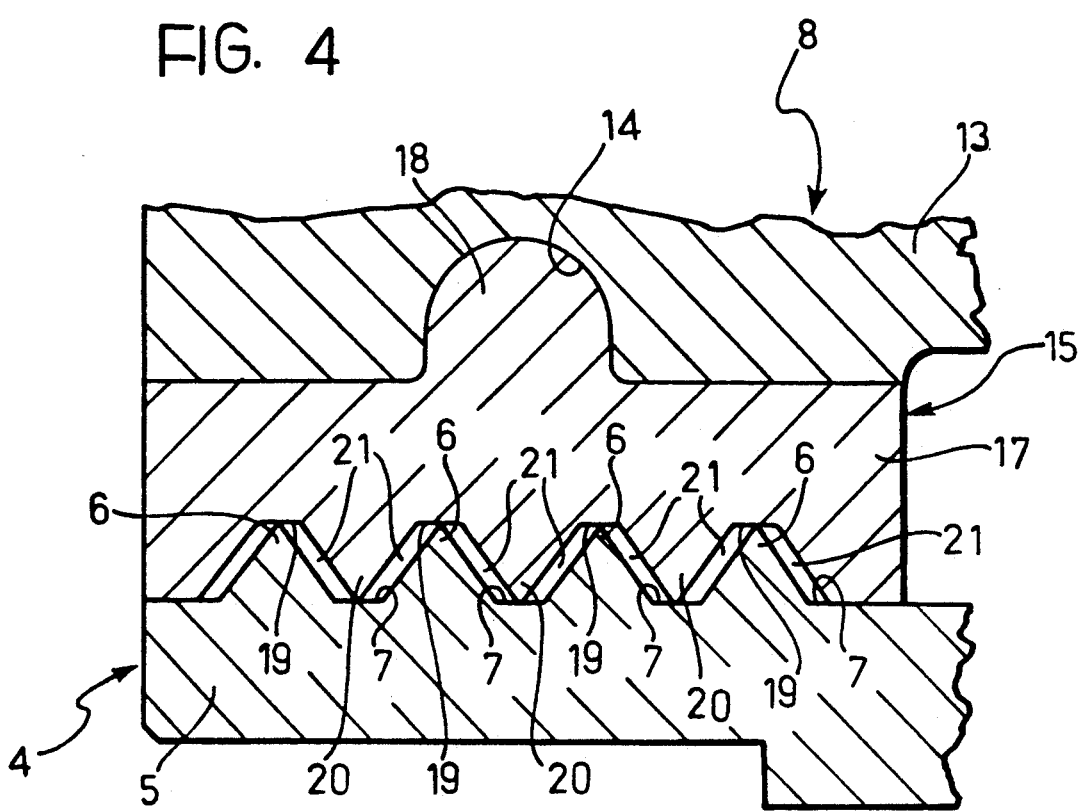

The invention will now be described in detail with reference to the appended drawings, provided purely by way of non-limiting example, in which:

FIG. 1 is a schematic vertical section of part of an internal combustion engine for motor vehicles according to the invention, FIG. 2 is an exploded perspective view of part of FIG. 1, FIG. 3 shows a detail of FIG. 1 on an enlarged scale, and FIG. 4 shows a variant of FIG. 3.

With reference first to FIGS. 1 and 2, a part of the head of an internal combustion engine for motor vehicles, schematically indicated 1, has a peripheral connecting flange 2 at its top and, adjacent thereto, a bearing 3 for an end of a camshaft 10 which projects from one end of the head 1 for the mounting of a drive pulley 11.

In conventional manner, an end cap 4 is fixed to the bearing 3 to retain the end of the camshaft rotatably. The cap 4 has a portion 5 of semicircular profile in which a shaft sealing ring 16 for the end of the camshaft 10 is arranged with its lower portion bearing against a semicircular recess 12 in the peripheral flange 2 of the head 1.

The outer surface of the arcuate part 5 of the cap 4 is formed with a series of alternating, adjacent projections 6 and grooves 7 which, as can be seen better in FIG. 3, have identical V-shaped cross-sections.

A cover, indicated 8, has a peripheral connecting flange 9 at its bottom complementary to the flange 2 of the head 1. In correspondence with the recess 12 in the latter, the connecting flange 9 in turn has a corresponding semicircular recess 13 in the central region of which is formed a channel 14 which extends around the entire flange 9.

A gasket 15 of resiliently compressible material is interposed between the connecting flanges 2 and 9 of the head 1 and the cover 8 respectively. The gasket 15 has a semicircular portion 17 arranged between the semicircular recess 13 of the cover 8 and the semicircular part 5 of the cap 4 and an upper rib 18 inserted in the channel 14 in the cover 8.

The inner surface of the semicircular portion 17 of the gasket 15 is formed with a plurality of grooves 19 and projections 20 complementary to the projections 6 and grooves 7 of the cap 4 and engaged therewith.

When the cover 8 is mounted on the head 1, the gasket 15 is clamped between the connecting flanges 9 and 2 so that its semicircular portion 17 is compressed between the semicircular portion 13 of the cover 8 and the semicircular portion 5 of the cap 4. As a result of this compression, a plurality of adjacent sealing barriers are formed between the projections 20 and the grooves 7 on the one hand and between the projections 6 and the grooves 19 on the other hand and, in use, these prevent any leakage of lubricating oil in the region where the end of the camshaft 10 projects from the head 1.

According to the variant of FIG. 4, in which parts identical or similar to those described above are indicated by the same reference numerals, the shapes of the grooves 7 in the semicircular part 5 of the cap 4 and of the grooves 19 in the semicircular part 17 of the gasket 15 differ from those of the respective projections 6 and 20, unlike the embodiment described above. In fact, the grooves 7, 19 are wider than the projections 6, 20 so that they define intermediate sealing chambers 21 therewith.

Naturally, the details of construction and forms of embodiment may be varied widely with respect to those described and illustrated, without thereby departing from the scope of the present invention.

I claim:

1. An internal combustion engine for motor vehicles, comprising a head, provided with bearings formed therein and having a peripheral edge, at least one camshaft having opposite ends and supported for rotation by the said bearings, respective arcuate retaining caps fixed to the bearings, in which the bearing and the respective cap for at least one end of the shaft are adjacent the peripheral edge of the head, a cover for the head having a peripheral edge which is fixed to that of the head and, in correspondence with the end cap, has a portion of complementary arcuate profile, and a gasket which is interposed between fixing edges of the head and the cover and has an arcuate portion interposed between the end cap and said portion of the cover of complementary arcuate profile, wherein the end cap has an outer surface formed with a plurality of alternating, parallel grooves and projections and the corresponding arcuate portion of the gasket has an inner surface formed with a plurality of alternating, parallel projections and grooves engaged respectively with the grooves and projections of the outer surface of the end cap.

2. An engine according to claim 1, wherein said grooves and projections have V-shaped cross-sections with corresponding dimensions.

3. An engine according to claim 1, wherein said projections have V-shaped cross-sections and the said grooves are wider than the projections.

* * * * *